United States Patent [19]

Martin, Jr.

[11] Patent Number: 4,619,479
[45] Date of Patent: Oct. 28, 1986

[54] LIFT TRUCK CAB

[76] Inventor: Robert P. Martin, Jr., 12576 Lake Ave., Lakewood, Ohio 44107

[21] Appl. No.: 711,972

[22] Filed: Mar. 14, 1985

[51] Int. Cl.$^4$ ............................................. B62D 33/06
[52] U.S. Cl. .................................... 296/190; 296/102; 296/146
[58] Field of Search ....................... 296/190, 146, 102; 180/89.12, 89.17; 49/406, 404

[56] References Cited

U.S. PATENT DOCUMENTS

| | | | |
|---|---|---|---|
| 3,866,969 | 2/1975 | Sandrock | 296/190 |
| 4,009,901 | 3/1977 | Barbee | 296/190 |
| 4,079,985 | 3/1978 | Martin | 296/28 |
| 4,133,574 | 1/1979 | Martin | 296/190 |
| 4,221,274 | 9/1980 | Martin, Jr. | 296/190 |
| 4,464,864 | 8/1984 | Yackiw | 49/406 |

Primary Examiner—Robert R. Song
Attorney, Agent, or Firm—Pearne, Gordon, Sessions, McCoy, Granger & Tilberry

[57] ABSTRACT

A fully enclosed protective cab for an industrial lift truck affording a high degree of visibility and including a rear face with a retractable panel section adapted to permit engine cover movement for access to the truck engine. The retractable rear panel section is arranged to slide in its plane between extended and retracted operational positions, thereby taking up minimum space, and is transparent to afford a clear rearward view in both of its operational positions.

6 Claims, 7 Drawing Figures

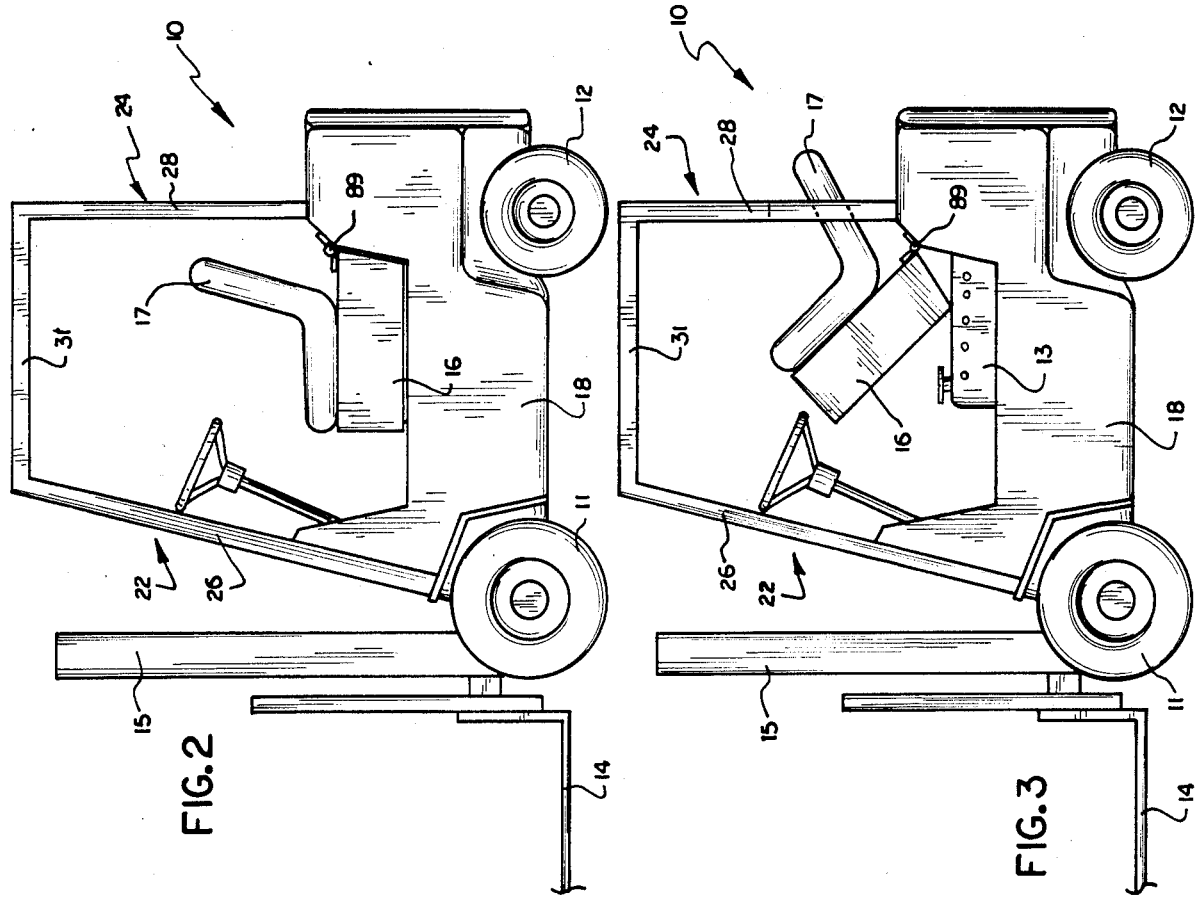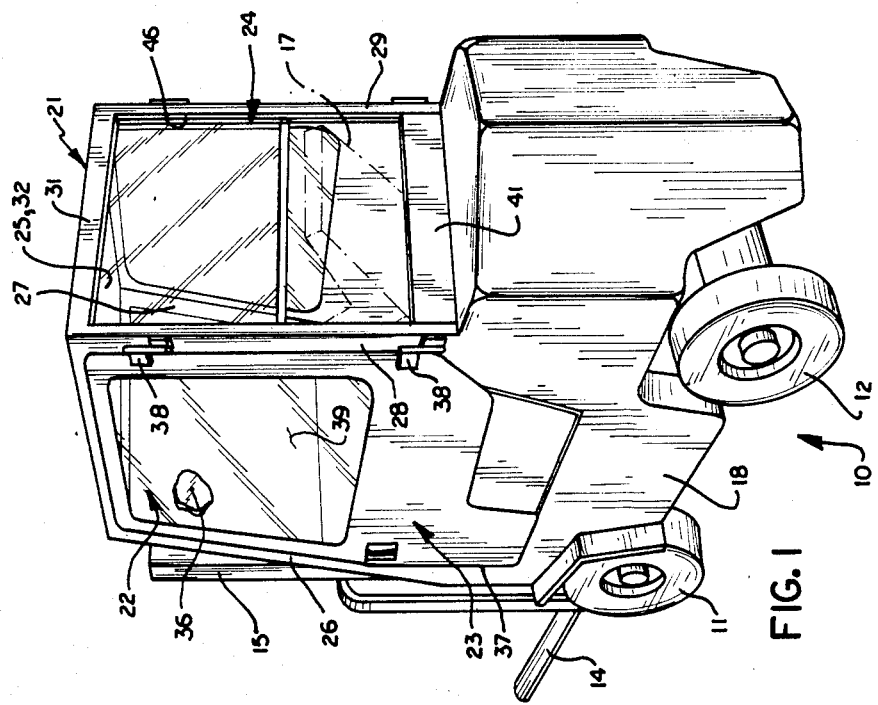

LIFT TRUCK CAB

BACKGROUND OF THE INVENTION

The invention relates to improvements in protective cabs for industrial lift trucks.

PRIOR ART

Operator cabs for industrial lift trucks, such as disclosed in U.S. Pat. No. 4,079,985, to Martin, provide overhead protection from falling objects as well as from harsh environmental conditions such as severe weather, air pollution, and industrial noise. A primary consideration in the design of such cabs is avoidance of unnecessary obstructions to the view afforded the operator. As the operator's field of view is limited, the efficiency by which he can maneuver and avoid obstacles is reduced. It is therefore advantageous to provide as much window area as possible in the faces of the cab.

In certain truck designs, it is desirable that the rear face of the cab be situated near the operator's seat. However, this location often presents a problem by obstructing access to areas of the truck. For example, an engine cover and/or an operator's seat may be required to be moved to provide access to the engine, drive train, or other interior components of the truck. Where this movement is to the rear, it is potentially obstructed by the rear cab face. This difficulty can be compounded in some instances by the presence of a fuel tank or other obstruction mounted on the truck frame behind the rear cab face.

SUMMARY OF THE INVENTION

The invention provides a lift truck cab for completely enclosing the operator's station while maintaining a substantially unobstructed, all-around view and providing a rear face lower panel portion retractably mounted on the cab to afford clearance for access movement of truck-mounted components overlying the engine or other internal elements of the truck. The lower rear panel portion is guided for movement in a plane parallel to the cab rear face so that it takes up limited space in its extended and retracted positions and in movement between such positions. In warm weather conditions, the rear panel portion can be retracted for the additional purpose of ventilation.

In the disclosed embodiment, the rear cab face includes upper and lower transparent panels. The lower panel is carried on channel elements that extend along two rear, generally upright corner members. The combined area of the transparent panels provides a substantially unobstructed view between the corner members to the rear of the truck. The lower panel, guided by the channels, is conveniently raised to a retracted position, where it lies adjacent the upper panel. A releasable latch holds the lower panel in this retracted, elevated position. In this position, the lower panel can, for example, provide sufficient clearance for an engine cover to be raised and an operator seat mounted on the cover to pass through the area it occupies in its normal extended, closed position.

BRIEF DESCRIPTION OF THE DRAWINGS

FIG. 1 is a rear, perspective view of an industrial lift truck and a cab mounted thereon constructed in accordance with the invention;

FIG. 2 is a side elevational view of the lift truck and cab;

FIG. 3 is a view similar to FIG. 2 but with a lower rear panel of the cab retracted to permit the operator's seat to pass through the plane of the rear cab face for access to the truck engine;

DESCRIPTION OF THE PREFERRED EMBODIMENT

Figure 4:
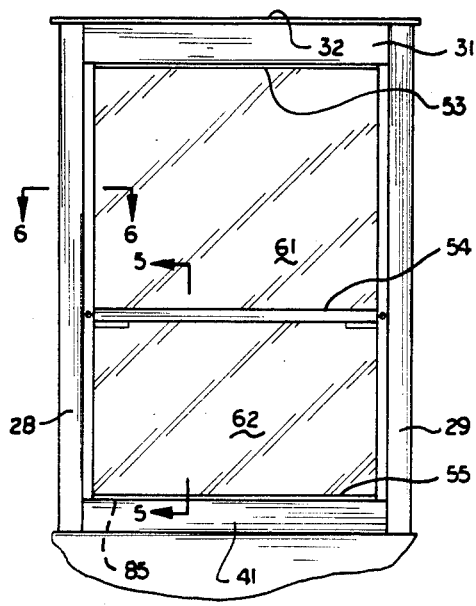
FIG. 4 is a rear elevational view of the cab.

Referring now to the Figures, there is shown a generally conventional industrial lift truck 10. The truck is supported on a set of four wheels 11, 12. The front wheels 11 are propelled by an internal combustion engine 13 through a drive train (not shown). Lifting forks 14 at the front of the truck 10 are movable vertically along a mast 15 for conveying and elevating material. The engine 13 is shrouded by a cover 16. A seat 17 for an operator is mounted on the engine cover 16. The seat 17 forms the station at which the operator drives and otherwise controls the lift truck 10.

A cab 21 surrounds the operator's station formed by the seat 17. The cab is a generally boxlike structure including front, side, and rear faces 22–24, respectively, as well as a rectangular roof 25. In the illustrated case, the cab 21 includes a set of elongated, generally upright corner posts 26–29, inclusive, one at the intersection of each of its faces.

The corner posts 26–29 and four generally horizontal, elongated frame members 31 at the perimeter of the roof 25 are preferably formed of rectangular steel tubing. Adjacent ends of the roof frame members 31 and upper ends of each corner post member 26–29 are rigidly joined together by welding so that each corner post supports the roof 25. The lower ends of the corner posts 26–29 are bolted or otherwise fixed to a frame 18 of the truck 10 in a conventional manner.

A steel sheet panel 32 overlies and is secured to the roof frame members 31. The panel 32 provides overhead protection for the operator's station against falling objects as well as from adverse environmental conditions such as rain, dust, noise, and the like. The roof 25 can be provided with a glass windowpane in a known manner to provide overhead vision. A major area of the front face 22 of the cab 21 is formed by a large windshield 36 of shatter-resistant glass which is mounted to the front corner posts 26,27 in a conventional manner. The side walls 23 of the cab 21 are formed by doors 37, each pivotally mounted on an associated rear corner post 28, 29. Preferably, the door hinges 38 are arranged in a known manner to permit the doors 37 to be removed by simply lifting them vertically relative to their respective corner posts 28, 29. The doors 37 are fabricated from steel sheet stock and are provided in their upper sections with large side window assemblies 39.

Figure 6:
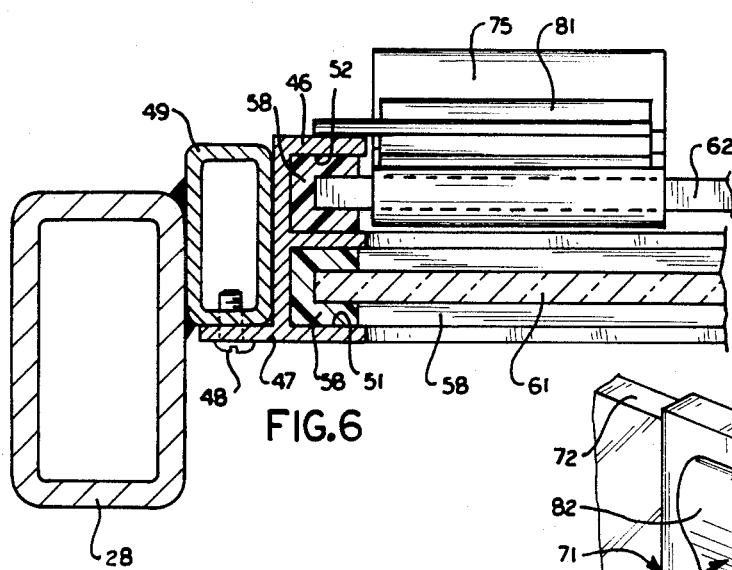
FIG. 6 is a fragmentary, cross-sectional view of the cab, taken along the line 6—6 of FIG. 4.
Figure 7:
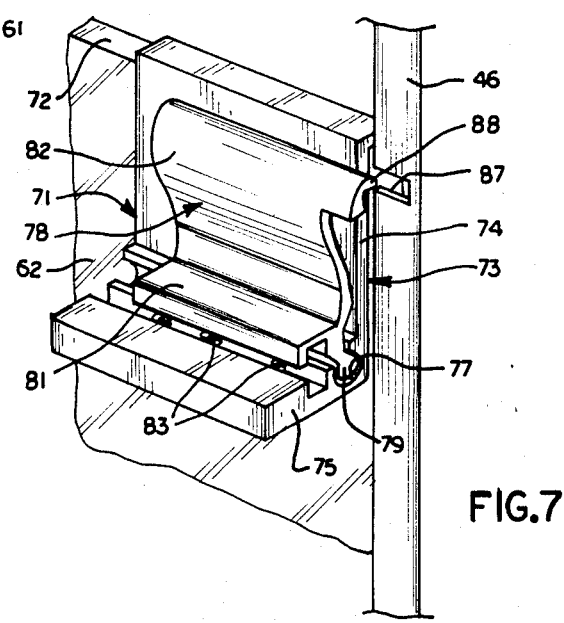
FIG. 7 is a perspective view of a handle and latch assembly associated with the retractable lower rear panel.

The rear face 24 of the cab 21 is generally bounded at the sides by the two rear corner posts 28, 29, at the top by the frame member 31, and at the bottom by a horizontal steel cross member 41 welded or otherwise secured adjacent its ends to the lower ends of the rear corner posts. A double channel element 46 is mounted along substantially the full length of each of the rear corner posts 28, 29. As indicated most clearly in FIG. 6, each double channel element 46 has an integral flange 47 which is secured by screws 48 to a rectangular steel tube 49, which in turn is welded to the associated main corner post 28 or 29. Recesses 51, 52 of the channel element 46 at opposite sides of the cab 21 face towards one another.

Three single channel crosspieces 53–55 extend horizontally between the vertical channels 46. Upper and middle ones of the horizontal channels 53,54, respectively, are aligned with outer ones of the recesses 51 of the vertical side channels 46. A recess 56 of the upper channel 53 faces downwardly while a recess 56 of the middle channel 54 faces upwardly. The upper channel 53 abuts the horizontal frame member 31. A recess 56 of the lower channel 55 is aligned with the inner recess 52 of the side channels 46 and faces upwardly. The horizontal channels 53–55 are rabbeted at their ends to fit into the recesses 51, 52 of the channels 46 with which they are aligned, and are retained in place by screws 57.

Preferably, the double and single channel elements 46, 53–55 are fabricated from extruded aluminum stock. Extruded semirigid plastic or rubber channel stock 58 is fitted into the channel recesses 51, 52, and 56 for purposes of mounting upper and lower rear panel window portions 61, 62. These window portions 61, 62 are formed of shatter-resistant glass. The upper glass panel 61 is fixed in position on the rear face of the cab 10 by confinement in the outer vertical channel recesses 51 and recesses 56 of the upper and middle cross channels 53, 54. The channels 58 of the inner recesses 52 are sufficiently loose-fitting on the lower glass panel 62 to providie surfaces for guiding the lower panel in sliding contact therewith for generally vertical movement parallel to the plane of the rear face 24 of the cab 21, as established by the rear corner members 28, 29.

A pair of handle assemblies 71 are disposed at opposite sides of an upper edge 72 of the lower glass panel 62. A main body 73 of the handle assembly 71 is preferably formed as an aluminum extrusion with a J-channel section 74 and an integral finger grip bar 75. The body 73 is secured to the window panel 62 by conventional friction material 76 disposed in the recess of the J-channel 74. At the intersection of the finger grip bar 75 and the J-channel section 74 is a socket 77 of circular cross section. An extruded aluminum latch element 78 includes an elongated, cylindrical extension 79 that is assembled in the socket 77 to enable these elements to form a hinge. The latch 78 includes a finger grip bar section 81 and, generally at a right angle, a latch section 82. Disposed between the finger grip bars 75, 81 is a compression spring 83 which resiliently biases the latch element or section 82 towards the J-section 74.

Figure 5:
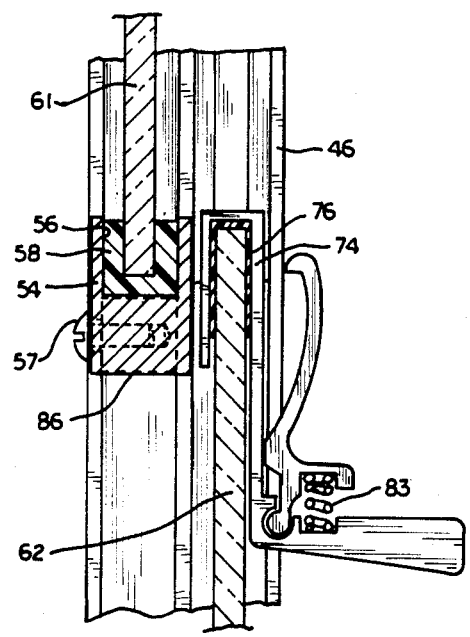
FIG. 5 is a fragmentary, cross-sectional view of the cab, taken along line 5—5 of FIG. 4.

As indicated in FIG. 5, a lower edge 86 of the upper window panel 61 and the associated channel 54 are outward and somewhat below the upper edge 72 of the lower window panel 62 when the lower panel is in its lowermost extended position. This overlapping relationship avoids entry of rain and dust into the cab.

In accordance with the invention, the lower window panel 62 can be retracted substantially vertically along the guiding surfaces of the channels 58 to open a path through the plane of the rear face 24 of the cab 21. This window movement is accomplished by manually gripping the finger grip bars or handles 75 and forcing the lower panel 62 upwardly along the tracks formed by the channels 58. For each handle assembly 71, a slot 87 is cut into an inward face of its associated side channel 46. The slots 87 are arranged to receive the latch elements 78 when the lower window panel 62 has its lower edge 85 raised substantially to the same level as the lower edge 86 of the upper window panel 61. The spring 83 causes an edge 88 of the latch element 78 to extend into the slot 87 with which it is aligned. The spring 83 is effective to maintain the latch edge 88 in the slot 87 so as to keep the lower window portion 62 in this position. The latch 78 is released from the slot 87 to lower the window portion 62 by depressing the finger bar 81 against the spring 83.

As indicated in FIG. 3, with the lower window portion 62 raised to its retracted position, the engine cover 16 may be raised about pivot pins 89 of conventional construction to gain access to the engine 13 or other internal components. In the illustrated truck design, the operator's seat 17 is mounted on the engine cover 16 so that it pivotally swings in unison with the engine cover 16. The geometry of the seat 17 relative to the engine cover pivot 89 requires that the seat pass through the plane of the rear cab face 24. This movement of the seat 17 is unrestricted when the lower window panel 62 is in the retracted raised position of FIG. 3. In FIG. 1, the phantom position of the seat 17 corresponds to the raised position of the engine cover 16. The lower window portion 62 can also be raised to provide ventilation in the cab 21 during periods of use of the truck 10. Such ventilation can be particularly useful during periods of light rain when it would be impractical to operate the truck with the doors 37 removed. In FIGS. 2 and 3, the doors of the cab have not been shown for purposes of illustration and simplification.

It is contemplated that the rear cross member 41 may be eliminated in certain truck designs so as to provide additional clearance for movement of an engine cover, seat or other truck components for servicing, maintenance, inspection or the like.

While the invention has been shown and described with respect to a particular embodiment thereof, this is for the purpose of illustration rather than limitation, and other variations and modifications of the specific embodiment herein shown and described will be apparent to those skilled in the art all within the intended spirit and scope of the invention. Accordingly, the patent is not to be limited in scope and effect to the specific embodiment herein shown and described, nor in any other way that is inconsistent with the extent to which the progress in the art has been advanced by the invention.

What is claimed is:

1. In combination, an industrial lift truck and a cab on the truck, the truck including a frame, an engine mounted on the frame, and components in the cab mounted on the frame, the cab comprising a roof structure for protecting the operator from falling objects, weather, airborne pollution, and the like, four generally upright corner members supporting the roof adjacent their upper ends and for attachment to the truck at their lower ends, a pair of said corner members being disposed adjacent the left and right front of the cab and another pair of said upright corner members being generally disposed adjacent the left and right rear of the cab, a transparent windshield supported on the front pair of upright corner members, left and right side walls supported on left and right ones of said upright corner members, respectively, a rear wall supported on the rear pair of corner members, the rear wall including an upper transparent panel and a lower panel, the lower panel being movably mounted relative to the upper panel between extended and retracted positions, guide means supported on said rear corner members for guiding said lower panel for movement between said extended and retracted positions, the retracted position being generally elevated relative to the extended position, said lower panel in its extended position cooperating with the upper panel to close off the zone between the rear pair of corner members and thereby exclude environmental intrusion, said components of the truck being movably mounted in the cab for access to the motor, said lower panel in its retracted position permitting said components of the truck to pass through the space of its extended position, and means on said cab for releasably holding said lower panel in its retracted position.

2. The combination as set forth in claim 1, wherein said upper and lower rear wall panels are substantially planar.

3. The combination as set forth in claim 2, wherein said lower panel in its extended position is in a plane generally parallel to the plane of the upper panel.

4. The combination as set forth in claim 3, wherein said lower panel in its retracted position is in generally the same plane as it occupies in its extended position.

5. The combination as set forth in claim 4, wherein said guiding means guides said lower panel for translatory movement in its plane.

6. In combination, an industrial lift truck including a frame, an engine mounted on the frame, an engine cover unit overlying the engine and pivotally supported on the frame, an operator station adjacent the engine cover, a cab for protecting the operator from falling objects and adverse environmental conditions, the cab comprising a roof overlying the operator's station, a set of four generally upright corner members supporting the roof adjacent their upper ends and attached to the truck frame adjacent their lower ends, a pair of said corner members being disposed adjacent the left and right front of the cab and another pair of said corner members being disposed adjacent the left and right rear of the cab, left and right side walls supported on left and right ones of said corner members, respectively, a rear wall supported on the rear pair of corner members, the rear wall including upper and lower transparent panels extending between said rear corner members in generally parallel upright planes, the transparent panels each having top and bottom edges, the top edge of the upper panel being adjacent the roof, the lower panel lying in a plane forward of the plane of the upper panel, channel elements supported on each of said rear corner members, said channel elements being arranged to guide said lower panel for translatory motion between and extended position and a retracted position, said lower panel in said extended position having its bottom edge substantially below the bottom edge of the upper panel and in said retracted position having its bottom edge adjacent the bottom edge of the upper panel, means to releasably hold said lower panel in its retracted position, the lower panel in its extended position lying in the path of an element on the engine cover when it is moved for access to the engine and providing clearance for such cover movement in its retracted position.

* * * * *